(12) United States Patent
Chirhart

(10) Patent No.: US 9,298,445 B1
(45) Date of Patent: Mar. 29, 2016

(54) SYSTEMS AND METHODS FOR CORRELATING SOFTWARE INVENTORY INFORMATION WITH DELIVERED SOFTWARE

(75) Inventor: Gary Chirhart, Milford, MI (US)

(73) Assignee: Symantec Corporation, Mountain View, CA (US)

( * ) Notice: Subject to any disclaimer, the term of this patent is extended or adjusted under 35 U.S.C. 154(b) by 1108 days.

(21) Appl. No.: 12/554,247

(22) Filed: Sep. 4, 2009

(51) Int. Cl.
G06F 15/177 (2006.01)
G06F 9/44 (2006.01)
G06F 9/445 (2006.01)

(52) U.S. Cl.
CPC .... *G06F 8/65* (2013.01); *G06F 8/60* (2013.01)

(58) Field of Classification Search
CPC ............. G06F 8/65; G06F 8/60; G06F 11/30; H04L 67/34
USPC .................. 709/221, 222; 717/171, 172, 173
See application file for complete search history.

(56) References Cited

U.S. PATENT DOCUMENTS

| | | | | |
|---|---|---|---|---|
| 6,167,567 A * | 12/2000 | Chiles et al. | ................... | 717/173 |
| 6,502,124 B1 * | 12/2002 | Shimakawa et al. | .......... | 709/203 |
| 6,917,958 B1 * | 7/2005 | Howe et al. | .................... | 709/203 |
| 7,149,705 B1 * | 12/2006 | Haruki et al. | .............. | 705/14.67 |
| 7,565,517 B1 * | 7/2009 | Arbon | ....................... | G06F 8/63 709/220 |
| 7,707,571 B1 * | 4/2010 | Harris | ....................... | G06F 8/61 717/174 |
| 7,818,741 B1 * | 10/2010 | Bourdev | ....................... | 717/174 |
| 7,925,635 B1 * | 4/2011 | Ravulur et al. | ................ | 707/688 |
| 8,365,164 B1 * | 1/2013 | Morgenstern | ............. | G06F 8/61 717/108 |
| 8,473,938 B1 * | 6/2013 | Feeser | ....................... | G06F 8/65 717/168 |
| 8,577,761 B1 * | 11/2013 | Wookey | ................ | G06Q 10/06 705/35 |
| 8,621,455 B1 * | 12/2013 | Feeser | ....................... | G06F 8/61 709/221 |
| 8,682,943 B1 * | 3/2014 | Faty | .................... | H04L 41/0853 707/827 |
| 2002/0002704 A1 * | 1/2002 | Davis et al. | ...................... | 717/11 |
| 2002/0144248 A1 * | 10/2002 | Forbes et al. | ................. | 717/167 |
| 2002/0170052 A1 * | 11/2002 | Radatti | ......................... | 717/171 |
| 2003/0046676 A1 * | 3/2003 | Cheng et al. | ................... | 717/173 |
| 2003/0159137 A1 * | 8/2003 | Drake et al. | ................... | 717/172 |
| 2004/0003387 A1 * | 1/2004 | Ballard et al. | ................ | 717/170 |
| 2004/0181790 A1 * | 9/2004 | Herrick | ......................... | 717/168 |
| 2004/0210653 A1 * | 10/2004 | Kanoor et al. | ................ | 709/223 |
| 2005/0027846 A1 * | 2/2005 | Wolfe et al. | .................... | 709/223 |
| 2005/0257214 A1 * | 11/2005 | Moshir et al. | ................. | 717/171 |
| 2006/0080656 A1 * | 4/2006 | Cain et al. | ...................... | 717/174 |

(Continued)

OTHER PUBLICATIONS

Colin Bartram, Software inventory management: The cornerstone of effective license compliance, Enterprise Networks & Servers—A chronicle of information for networks and servers in the enterprise, Dec. 2005 issue, http://web.archive.org/web/20071013091110/http://www.enterprisenetworksandservers.com/monthly/art.php?1887, as accessed on Jun. 22, 2009.

*Primary Examiner* — Philip Chea
*Assistant Examiner* — Wing Ma
(74) *Attorney, Agent, or Firm* — ALG Intellectual Property, LLC

(57) ABSTRACT

A method for correlating software inventory information with delivered software. The method may include delivering a software application to a first client system. The method may also include receiving, from an agent that monitors installations on the first client system, application registration information written to the client system during installation of the software application. The method may further include identifying delivery information that corresponds to the software application and associating the application registration information with the delivery information. Various other methods, systems, and computer-readable media are also disclosed.

20 Claims, 6 Drawing Sheets

(56) References Cited

U.S. PATENT DOCUMENTS

| | | | |
|---|---|---|---|
| 2006/0218246 A1* | 9/2006 | Fawcett | 709/218 |
| 2006/0236083 A1* | 10/2006 | Fritsch et al. | 713/1 |
| 2007/0169079 A1* | 7/2007 | Keller et al. | 717/168 |
| 2007/0174832 A1* | 7/2007 | Brehm et al. | 717/174 |
| 2008/0141240 A1* | 6/2008 | Uthe | 717/174 |
| 2008/0201701 A1* | 8/2008 | Hofhansl et al. | 717/168 |
| 2008/0215931 A1* | 9/2008 | Boss et al. | 714/57 |
| 2008/0263511 A1* | 10/2008 | Shapiro | 717/104 |
| 2009/0119662 A1* | 5/2009 | Fangmeier et al. | 717/176 |
| 2009/0144726 A1* | 6/2009 | Felts | 717/174 |
| 2009/0144730 A1* | 6/2009 | Chen | G06F 8/61 717/178 |
| 2009/0158271 A1* | 6/2009 | Shima | 717/174 |
| 2009/0172658 A1* | 7/2009 | Wood et al. | 717/174 |
| 2009/0180395 A1* | 7/2009 | Wood et al. | 370/252 |
| 2009/0259734 A1* | 10/2009 | Morikawa | G06F 8/61 709/220 |
| 2009/0271777 A1* | 10/2009 | Tow | G06F 8/65 717/171 |
| 2009/0276269 A1* | 11/2009 | Yee et al. | 705/8 |
| 2010/0042991 A1* | 2/2010 | Xu et al. | 717/178 |
| 2010/0106968 A1* | 4/2010 | Mori | H04L 63/12 713/158 |
| 2010/0175059 A1* | 7/2010 | Wetherly et al. | 717/170 |
| 2010/0198843 A1* | 8/2010 | Sirota et al. | 707/754 |
| 2010/0205266 A1* | 8/2010 | Wang | H04W 4/001 709/206 |
| 2010/0211663 A1* | 8/2010 | Barboy | G06F 17/30233 709/223 |
| 2010/0242033 A1* | 9/2010 | Fritsch et al. | 717/171 |

\* cited by examiner

SYSTEMS AND METHODS FOR CORRELATING SOFTWARE INVENTORY INFORMATION WITH DELIVERED SOFTWARE

BACKGROUND

In typical software delivery systems, delivered installs may be black boxes. The installs may make changes to the system, such as installing files and writing application registration information. On WINDOWS systems, installs typically write to an add-remove-programs area of the system's registry. When writing to the add-remove-programs area of the registry, an installation may set the product name, manufacturer, and version for the installed software in a registry entry.

Add-remove-programs entries created by an installation may differ slightly (or sometimes significantly) from the metadata of a setup file of the installation. For example, the metadata of a setup file may include a key that indicates a product name, version, and vendor. In this example, an add-remove-programs entry may provide similar information, but the version number may be slightly different. As a result, two different software programs may be reported for a single install—one from delivery and a second from inventory. What is needed, therefore, is a more efficient and effective mechanism for managing and identifying software installed on client systems.

SUMMARY

As will be described in greater detail below, the instant disclosure generally relates to systems and methods for correlating software inventory information with delivered software. Some embodiments of the instant disclosure address disconnects that may occur between client device installed software inventory information and client device software delivery information. Embodiments of the instant disclosure may also provide various other features and advantages.

In certain embodiments, a server-side method may include delivering a software application to a first client system. The method may also include receiving, from an agent that monitors installations on the first client system, application registration information written to the client system during installation of the software application. The method may further include identifying delivery information that corresponds to the software application and associating the application registration information with the delivery information.

According to some embodiments, the delivery information may include a first delivery key that identifies a vendor name, a product name, and a product version of the software application. In at least one embodiment, associating the application registration information with the delivery information may include creating a second delivery key that includes at least a portion of the application registration information.

The software application may include an update to a previously installed software entity. In such embodiments, associating the application registration information with the delivery information may include associating the application registration information with the previously installed software entity.

The method may include identifying a request to perform an inventory scan on the first client system and performing the inventory scan on the first client system. The inventory scan may identify the application registration information. The method may also include determining that the application registration information is associated with the previously installed software entity and, in response to the determination, associating the software application with the previously installed software entity in an inventory report for the first client system. The update to the previously installed software entity may include a patch for the previously installed software entity.

The method may include identifying a request to perform an inventory scan on a second client system and performing the inventory scan on the second client system. The inventory scan may identify an instance of the application registration information. The method may further include determining that the application registration information is associated with the delivery information and using the delivery information, instead of the application registration information, to report that an instance of the software application is installed on the second client system.

In certain embodiments, the method may include deploying the agent to the first client system. According to some embodiments, the application registration information may include data written to an add-remove-programs region of a registry of the first client system.

According to various embodiments, a server-side method may include receiving a software application deployed from a client-management system to a client system, initiating installation of the software application on the client system, and detecting application registration information written to the client system during installation of the software application. The method may also include identifying delivery information that corresponds to the software application and associating the application registration information with the delivery information. The delivery information may include a first delivery key that identifies at least one attribute of the software application, and associating the application registration information with the delivery information may include creating a second delivery key that includes at least a portion of the application registration information.

The method may include storing the second delivery key on the client system and making the second delivery key available to an add-remove-programs scanner on the client system. The method may also include sending the second delivery key to the client-management system.

In certain embodiments, detecting application registration information written to the client system during installation of the software application may include intercepting an attempt to write the registration information to the client system.

According to various embodiments, a system for correlating software inventory information with delivered software may include a client-management subsystem and a client subsystem. The client-management subsystem may include a deployment module programmed to deliver a software application to a client subsystem and a reception module programmed to receive, from a monitoring module that monitors installations on the client subsystem, application registration information written to the client system during installation of the software application. The client-management subsystem may also include a server-side association module programmed to identify delivery information that corresponds to the software application and associate the application registration information with the delivery information. The client-management subsystem may also include at least one processor configured to execute the deployment module, the reception module, and the server-side association module.

The client subsystem may include an installation module programmed to receive the software application deployed from the client-management subsystem and install the software application on the client system. The client subsystem may also include the monitoring module and a transmission module programmed to send the application registration information to the client-management subsystem.

In some embodiments, the delivery information may include a first key that identifies at least one attribute of the software application. In such embodiments, the client subsystem may include a client-side association module programmed to associate the application registration information with the delivery information by creating a second delivery key that includes at least a portion of the application registration information. The client-side association module may also be programmed to make the second delivery key available to an add-remove-programs scanner on the client subsystem. The application registration information may include data written to an add-remove-programs region of a registry of the first client system, and the software application may include a patch to a previously installed software entity.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
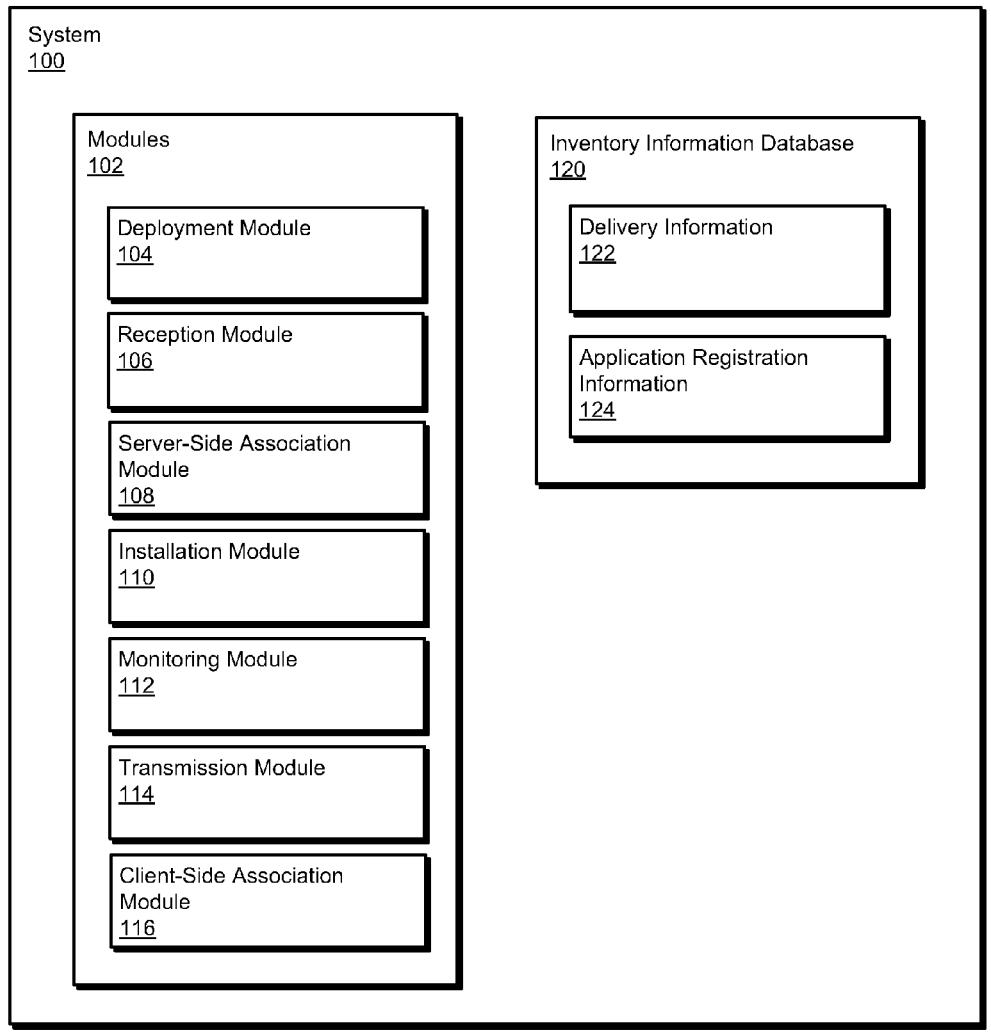
FIG. 1 is a block diagram of an exemplary system for correlating software inventory information with delivered software.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for correlating software inventory information with delivered software.

Figure 2:
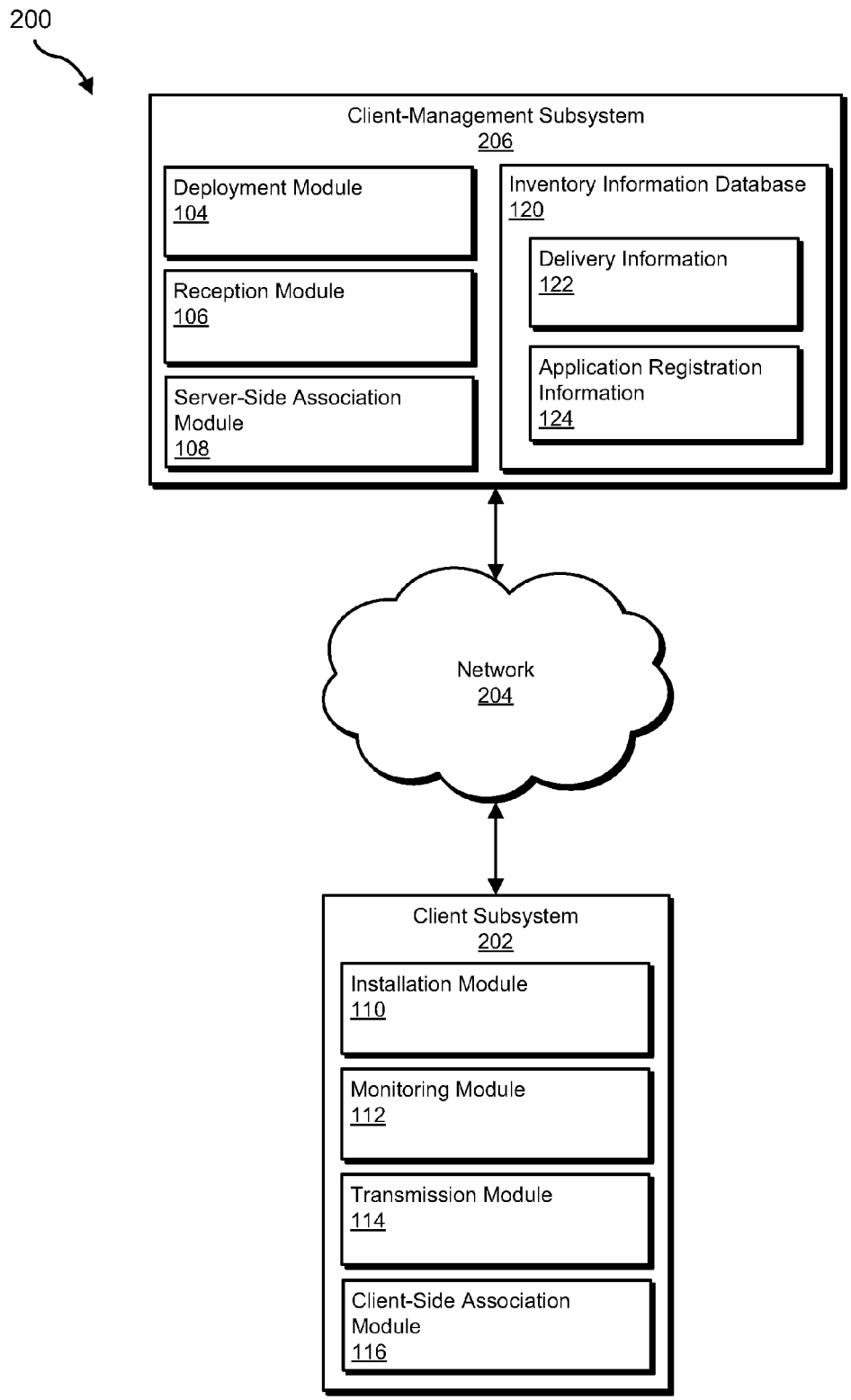
FIG. 2 is a block diagram of an exemplary system for correlating software inventory information with delivered software.

The following will provide, with reference to FIGS. 1-2, detailed descriptions of exemplary systems for correlating software inventory information with delivered software. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for correlating software inventory information with delivered software. As illustrated in this figure, exemplary system 100 may include one or more modules 102 for performing one or more tasks. For example, and as will be explained in greater detail below, exemplary system 100 may include a deployment module 104 programmed to deliver a software application to a client subsystem. Exemplary system 100 may also include a reception module 106 programmed to receive, from a monitoring module that monitors installations on the client subsystem, application registration information written to the client system during installation of the software application.

In addition, and as will be described in greater detail below, exemplary system 100 may include a server-side association module 108 programmed to identify delivery information that corresponds to the software application and associate the application registration information with the delivery information. System 100 may also include an installation module 110 programmed to receive the software application deployed from the client-management subsystem and to install the software application on the client subsystem.

As shown, system 100 may include a monitoring module 112 programmed to monitor installation on the client subsystem for application registration information written to the client subsystem. System 100 may also include a transmission module 114 programmed to send the application registration information to the client-management subsystem and a client-side association module 116 programmed to: (1) associate the application registration information with the delivery information by creating a key that includes at least a portion of the application registration information and (2) make the second key available to an add-remove-programs scanner on the client subsystem. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the systems illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include an inventory information database 120. Inventory information database 120 may store delivery information 122 and application registration information 124. In some embodiments, inventory information database 120 may associate delivery information of a software application with application registration information of the software application. Inventory information database 120 may represent portions of a single database or computing device or a plurality of databases or computing devices.

Inventory information database 120 in FIG. 1 may represent a portion of one or more computing devices. For example, inventory information database 120 may represent a portion of client-management subsystem 206 in FIG. 2, computing system 510 in FIG. 5, and/or portions of exemplary network architecture 600 in FIG. 6. Alternatively, inventory information database 120 in FIG. 1 may represent one or more physically separate devices capable of being accessed by a computing device, such as client management system 206 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a client-management subsystem 206 in communication with a client subsystem 202 via a network 204. Client subsystem 202 may include installation module 110, monitoring module 112, transmission module 114, and client-side association module 116. In some embodiments, one or more of the modules on client subsystem 202 may have been deployed from client-management subsystem 206. Client-management subsystem 206 may include deployment module 104, reception module 106, and server-side association module 108. Client-management subsystem 206 may also include inventory information database 120, which may include delivery information 122 and application registration information 124.

As used herein, the phrase "client-management subsystem" generally refers to any system for remotely managing one or more client devices. Client-management subsystems may deploy software to client systems, monitor client systems, troubleshoot and fix client systems, scan client systems, generate reports of software installed on and/or delivered to client systems, and/or provide a variety of other client management functions.

Client-management subsystem 206 generally represents any type or form of computing system that is capable of performing one or more client management functions. Examples of client-management subsystem 206 include, without limitation, application servers, deployment servers, and various other types of management servers and other computing devices.

Client subsystem 202 generally represents any type or form of computing device capable of reading computer-executable instructions. Examples of client subsystem 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a Wide Area Network ("WAN"), a Local Area Network ("LAN"), a Personal Area Network ("PAN"), the Internet, Power Line Communications ("PLC"), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
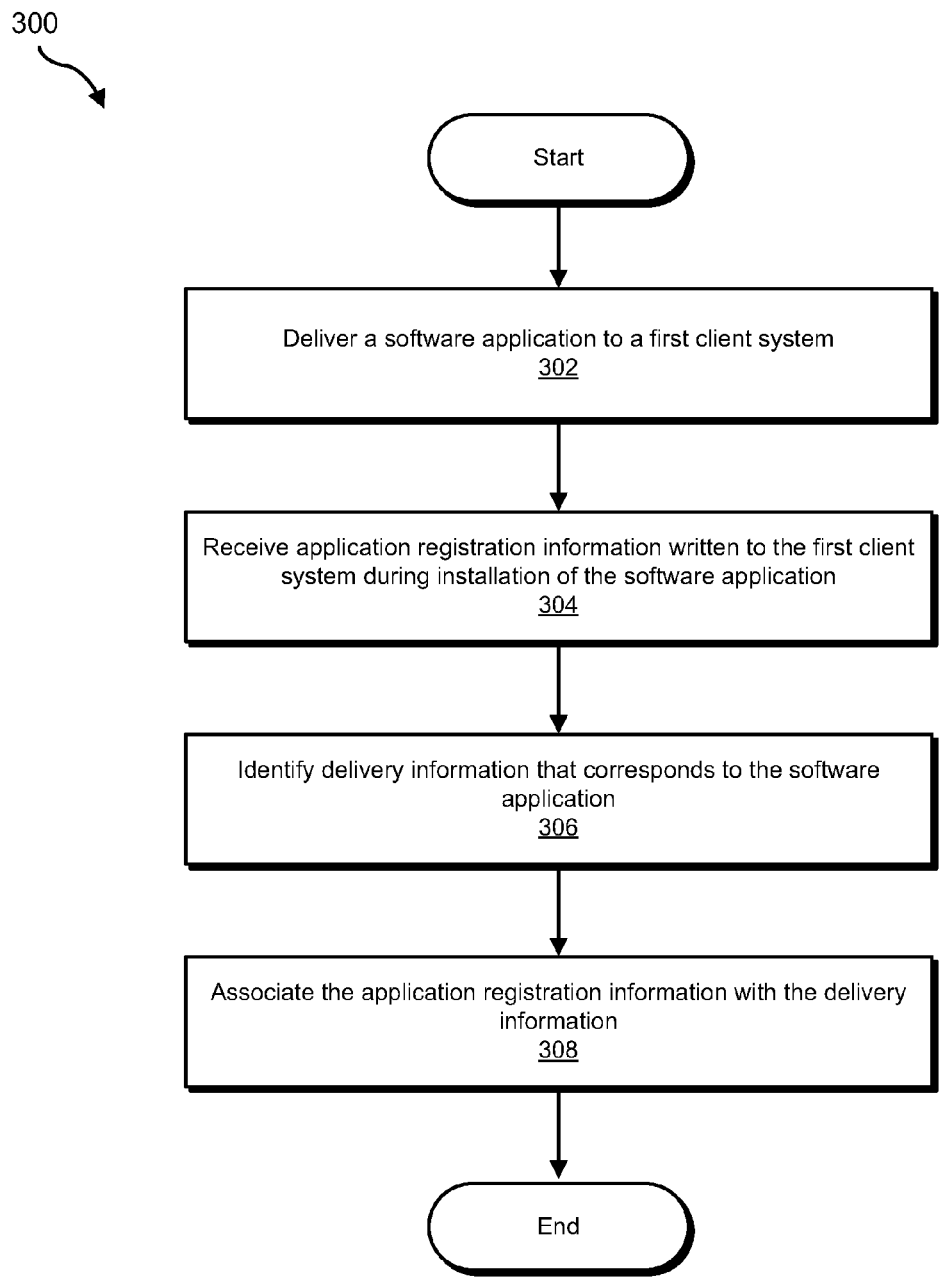
FIG. 3 is a flow diagram of an exemplary method for correlating software inventory information with delivered software.

FIG. 3 is a flow diagram of an exemplary computer-implemented method 300 for correlating software inventory information with delivered software. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. For example, at step 302, deployment module 104 on client-management subsystem 206 may deliver a software application to a first client system, such as client subsystem 202. Deployment module 104 may deliver the software application to the first client system in any suitable manner. For example, deployment module 104 may deliver the software application to the first client system by deploying the software application to the first client system over a network, such as network 204. The software application may also be delivered to the first client system via a storage medium, such as an optical disc, a USB drive, a hard disk drive, or through any other mechanism.

The software application may include any type of computer-executable code and data. For example, the software application may be an original installation package for a word processing program, an e-mail program, a graphics program, a database application, and/or any other type of software application. Alternatively, the software application may be an update to a previously installed software package. Examples of updates include patches, new versions, or any other type of update to a previously installed software application.

At step 304, reception module 106 may receive application registration information written to the client system during installation of the software application. For example, transmission module 114 on client subsystem 202 may send the application registration information to reception module 106 on client-management subsystem 206 after client subsystem 202 installs the delivered software application. The application registration information may also be received in any other suitable manner.

As used herein, the phrase "application registration information" generally refers to any data written to a client system by a software application to identify itself to the client system. For example, application registration information may include information written to an add-remove-programs region of a registry of the client system. The application registration information may identify one or more attributes of the software application. For example, the application registration information may identify a product name of the software application, a manufacturer of the software application, a version number of the software application, a language of the software application, an architecture of the software application (e.g., 32-bit, 64-bit, etc.), and/or any other information about the software application.

At step 306, server-side association module 108 may identify delivery information that corresponds to the software application. In some embodiments, the deliver information may be received from the client system along with the application registration information. Additionally or alternatively, server-side association module 108 may identify the delivery information by locating delivery information on the server that is associated with the application deployed to the client. For example, server-side association module 108 may query a database, such as inventory information database 120, to identify delivery information associated with the recently deployed software application.

The delivery information may be any information that identifies the delivered software application. For example, the delivery information may include a delivery key that indicates a vendor, product name, version number, language, architecture, and/or any other suitable information about the software application.

At step 308, server-side association module 108 may associate the application registration information with the delivery information. Server-side association module 108 may associate the application registration information with the delivery information in a variety of ways. For example, server-side association module 108 may link the application registration information with the delivery information in a database, such as inventory information database 120. Additionally or alternatively, server-side association module 108 may associate the application registration information with the delivery information by creating a second delivery key for the software application that includes some or all of the data in the application registration information and by associating the second delivery key with the software application. In such embodiments, when the software application is deployed in the future (e.g., to other client systems), the software application made be deployed with both the delivery information (i.e., the original delivery key) and the new delivery key that includes the application registration information identified previously.

The application registration information may also be used to identify and correlate installed software on the client system during future inventory scans. For example, client-management subsystem 206 may receive a request to perform an inventory scan on client subsystem 202. During the inventory scan, client-management subsystem 206 may identify software installed on the client subsystem by identifying entries in an add-remove-programs registry of the client system. Client-management subsystem 206 may also identify software installed on the client system by identifying a listing of software deployed to the client system. Client-management subsystem 206 may use previously created inventory/registration information associations to determine that one or more add-remove-programs entries discovered during the scan are associated with one or more deployed software applications.

As an example of the process shown in FIG. 3, a SYMANTEC PCANYWHERE software patch may be deployed from client-management subsystem 206 to client subsystem 202. A delivery key associated with the software package may provide the following vendor, product, and version information: SYMANTEC|PCANYWHERE|8.0. During installation, monitoring module 112 may detect that an add-remove-programs entry is created on client subsystem 202. The add-remove-programs entry may indicate the following vendor, product, and version information: SYMANTEC|PCANYWHERE|8.0.0.1. In this example, the add-remove-programs entry version number does not match the delivery key version number. As a result, add-remove-program scans, inventory scans, and other device inventory mechanisms may report multiple entries for SYMANTEC PCANYWHERE.

To address this issue, transmission module 114 on client subsystem 202 may send the add-remove-program entry to reception module 106 on client-management subsystem 206. Then, server-side association module 108 may use the add-remove-program entry to create an additional delivery key for the SYMANTEC PCANYWHERE patch. When SYMANTEC PCANYWHERE is delivered to a second client system, the second client system may receive the additional delivery key. The second client system may use the additional delivery key to avoid creating a duplicate add-remove-programs entry.

Additionally or alternatively, when the second client system receives the delivery key, a monitoring module may recognize that it does not need to monitor installation of the application to identify application registration information, which may result in more efficient installation of the application.

Providing client-management subsystem 206 with the add-remove-programs entry may also provide various other advantages. For example, when client-management subsystem 206 performs inventory scans on client devices, client-management subsystem 206 may recognize that a reported add-remove-programs entry of SYMANTEC|PCANYWHERE|8.0.0.1 is actually just a patch of SYMANTEC|PCANYWHERE|8.0 and may report the patch accordingly. Thus, client-management subsystem 206 may be able to provide more concise and/or useful inventory reports for client machines.

In some embodiments, client-management subsystem 206 may be able to correlate application delivery information with application registration information even if client-management subsystem 206 does not deploy a particular software application to a managed client system. Continuing with the previous example, a third client subsystem may download the 8.0.0.1 PCANYWHERE patch from the internet, from a CD or DVD, or from any other source distinct from client-management subsystem 206 (e.g., the patch may have been delivered to the third client subsystem before client-management subsystem 206 was installed).

After receiving the patch, the third client subsystem may install the patch. At a later point in time, client-management subsystem 206 may perform an inventory scan on the third client subsystem and may detect an add-remove-programs entry associated with the patch. Because client-management subsystem 206 already associates the add-remove-programs entry with PCANYWHERE 8.0, client-management subsystem 206 may provide a report that reflects the relationship between the 8.0.0.1 patch and PCANYWHERE 8.0 even though client-management subsystem 206 did not deploy the patch to the third client subsystem.

Figure 4:
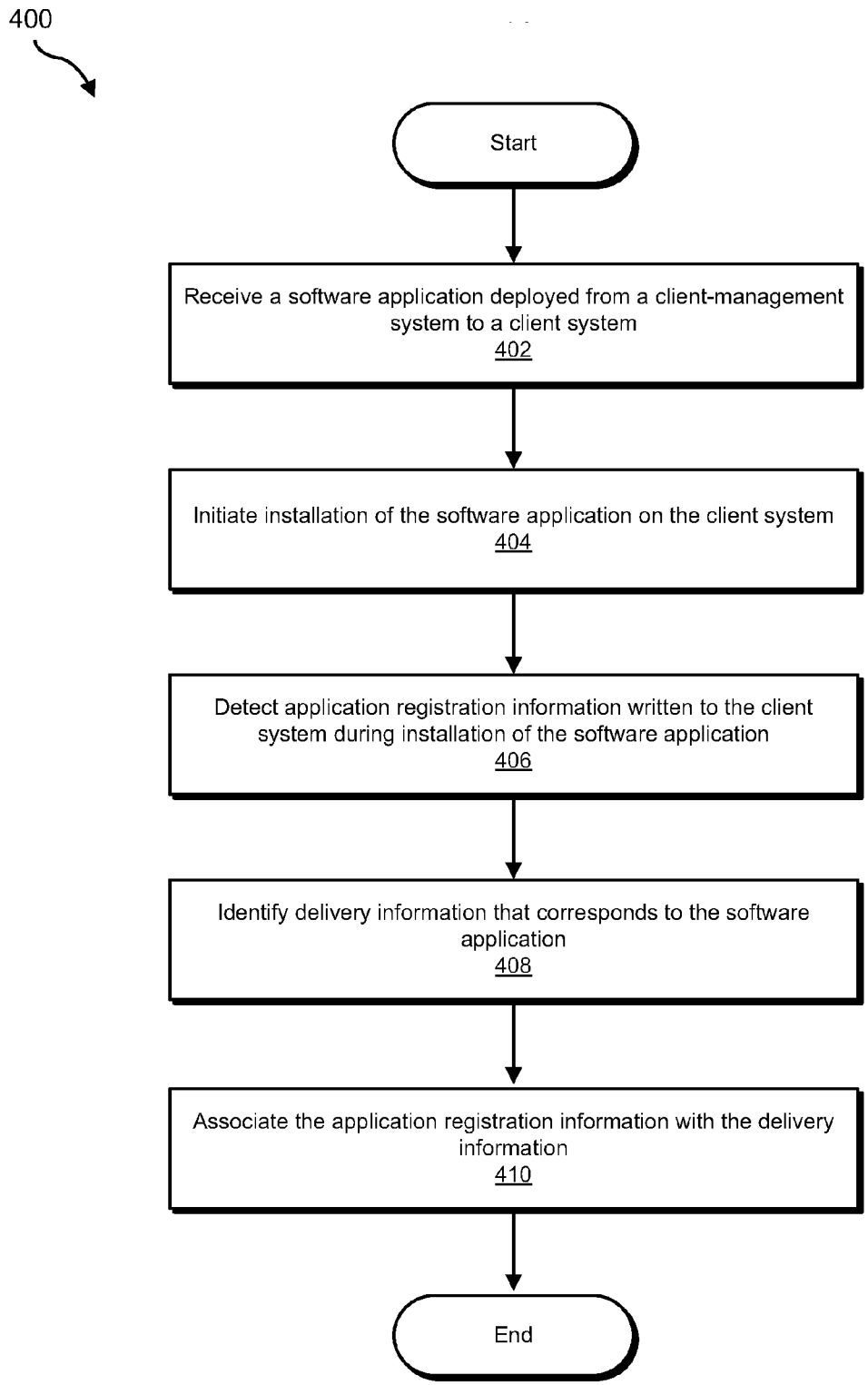
FIG. 4 is another flow diagram of an exemplary method for correlating software inventory information with delivered software.

FIG. 4 is a flow diagram of an exemplary computer-implemented method 400 for correlating software inventory information with delivered software. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2. For example, at step 402 installation module 110 on client subsystem 202 may receive a software application deployed from client-management subsystem 206 to client subsystem 202, and at step 404 installation module 110 may initiate installation of the software application on client subsystem 202.

During installation, at step 406 monitoring module 112 may detect application registration information written to client subsystem 202. Monitoring module 112 may detect the application registration information in a variety of ways. For example, monitoring module 112 may detect the application registration information by hooking processes that may write to an add-remove-programs region of client subsystem 202 and/or to any other region of client subsystem 202 to which registration information may be written. Additionally or alternatively, monitoring module 112 may monitor an application registration memory region of client subsystem 202, and if the region is written to during installation of the application, monitoring module 112 may identify the information being written as application registration information. In some embodiments, monitoring module 112 may scan an application registration information registry area (or other application registration region) of client subsystem 202 for additions and/or modification made to that region during installation to client subsystem 202.

As step 408, client-side association module 116 may identify delivery information that corresponds to the application. For example, client-side association module 116 may identify a delivery key provided with the software application. In some embodiments, the delivery key may be included as metadata (e.g., file version information) of an installation file (e.g., a setup.exe file, a WINDOWS installer file, etc.) of the application. In such embodiments, client-side association module 116 may scan the installation file to gather metadata from the installation file and may identify the delivery information within the metadata.

In some embodiments, before the application is delivered to client subsystem 202, server-side association module 108 on client-management subsystem 206 may receive user input that provides the delivery information. The delivery information provided by the user may be included with the deployed application and detected by client subsystem 202. In some embodiments (i.e., embodiments presented in FIG. 3), the delivery information may be stored on client-management subsystem 206 for use in one or more of the processes discussed in FIG. 3. Embodiments of the instant disclosure may be particularly useful for correlating delivery information received from a user because user input may be unlikely to match what is written to a registration area of a client subsystem.

At step 410 client-side association module 116 may associate the application registration information with the delivery information. In some embodiments, client-side association module 116 may store the application registration information on client subsystem 202. For example, client-side association 116 may make the application-registration information available to an add-remove-programs scanner on client subsystem 202 such that when client subsystem 206 presents a listing of programs, client subsystem 202 will not present duplicate program entries. Additionally or alternatively, client-side association module 116 may send the application registration information to a client-management system (e.g., client-management subsystem 206) that delivered the software. Client-side association module 116, in some embodiments, may store the application-registration information as a delivery key and/or other unit of information.

Figure 5:
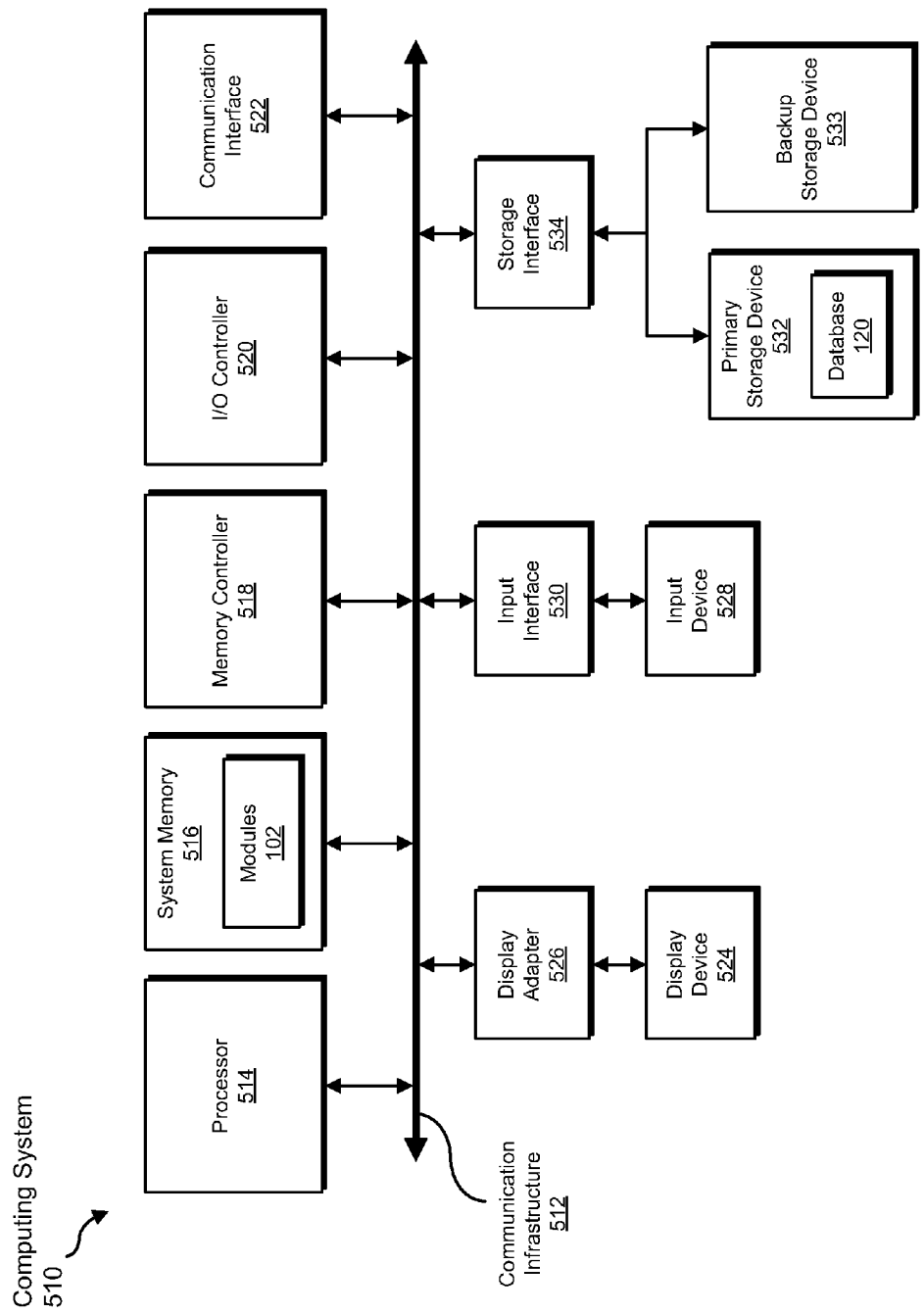
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the delivering, receiving, identifying, associating, performing, determining, using, deploying, initiating, detecting, storing, making, and sending steps described herein.

Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as delivering, receiving, identifying, associating, performing, determining, using, deploying, initiating, detecting, storing, making, and sending.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the delivering, receiving, identifying, associating, performing, determining, using, deploying, initiating, detecting, storing, making, and sending steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the delivering, receiving, identifying, associating, performing, determining, using, deploying, initiating, detecting, storing, making, and sending steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the delivering, receiving, identifying, associating, performing, determining, using, deploying, initiating, detecting, storing, making, and sending steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, inventory information database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the delivering, receiving, identifying, associating, performing, determining, using, deploying, initiating, detecting, storing, making, and sending steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
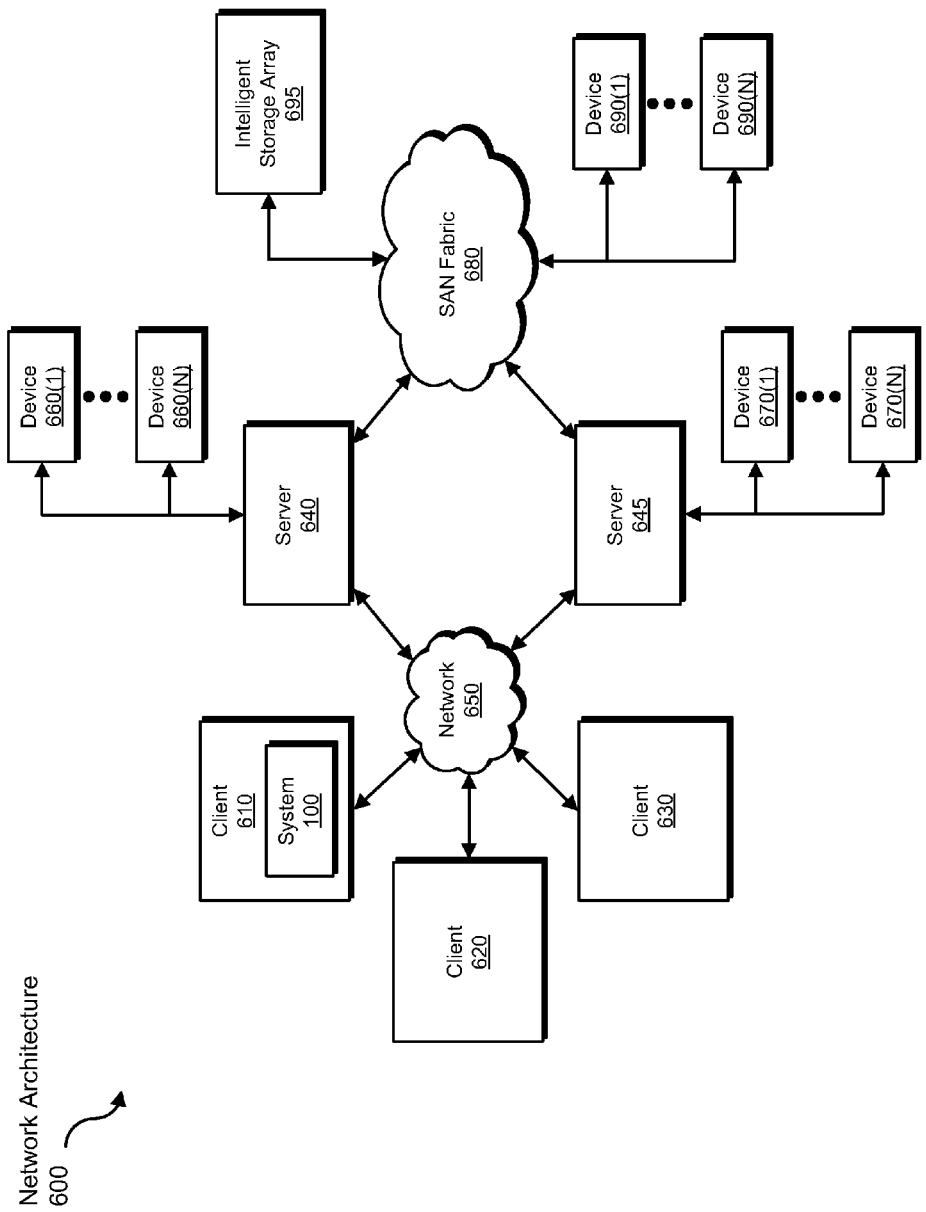
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the delivering, receiving, identifying, associating, performing, determining, using, deploying, initiating, detecting, storing, making, and sending steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for correlating software inventory information with delivered software.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

In addition, one or more of the modules described herein may transform data, physical devices, and/or representations of physical devices from one form to another. For example, one or more of the modules described herein may transform add-remove-program data into a delivery key for a software program.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for correlating software inventory information with delivered software, at least a portion of the method being performed by a computing device comprising at least one processor, the method comprising:
    delivering, from a client-management system to a first client system, an update to a previously installed software entity;
    receiving, at the client-management system, from an agent that monitors installations on the first client system, application registration information written to the first client system during installation of the update;
    identifying, at the client-management system, delivery information from the client-management system, wherein:
        the delivery information identifies the update;
        the delivery information comprises a first delivery key that identifies at least one of a vendor name, a product name, or a product version of the update;
        the delivery information does not match the application registration information;
    associating, at the client-management system, the application registration information with the delivery information by creating a second delivery key that includes at least a portion of the application registration information, wherein associating the application registration information with the delivery information comprises associating the application registration information with the previously installed software entity;
    delivering, from the client-management system, the update to a second client system by deploying the update to the second client system with both the first delivery key and the second delivery key such that delivering the update to the second client system does not result in duplicate application registration information being provided for the update in a registration area of the second client system as a result of the delivery information not matching an instance of the application registration information written to the second client system during installation of the update on the second client system.

2. The method of claim 1, further comprising:
    identifying a request to perform an inventory scan on the first client system;
    performing the inventory scan of the first client system, wherein the inventory scan identifies the application registration information written to the first client system;
    determining that the application registration information written to the first client system is associated with the previously installed software entity;
    in response to the determination, associating the update with the previously installed software entity in an inventory report for the first client system.

3. The method of claim 2, wherein the inventory scan identifies the application registration information written to the first client system by identifying entries in an add-remove programs registry of the first client system.

4. The method of claim 1, further comprising:
    determining, at the second client system and in response to having received the second delivery key, that a monitoring module, stored in memory of the second client system, does not need to monitor installation of the update on the second client system.

5. The method of claim 1, wherein:
    the application registration information written to the first client system comprises information written to the first client system by the first client system to identify itself to the first client system;
    receiving the application registration information comprises receiving the application registration information after the first client system has installed the update;
    the delivery information comprises information provided with the update at the time the update is delivered;
    delivering the update to the first client system comprises:
        before delivering the update to the first client system, receiving user input that provides the delivery information;
        including the delivery information with the update;
        delivering the update including the delivery information to the first client system.

6. The method of claim 1, further comprising:
    identifying a request to perform an inventory scan on an additional client system;
    performing the inventory scan of the additional client system, wherein the inventory scan of the additional client system identifies an instance of the application registration information;
    determining that the identified application registration information is associated with the delivery information;
    using the delivery information, instead of the identified application registration information, to report that an instance of the update is installed on the additional client system.

7. The method of claim 1, further comprising:
    deploying the agent to the first client system.

8. The method of claim 1, wherein:
    the application registration information written to the first client system comprises data written to an add-remove-programs region of a registry of the first client system.

9. The method of claim 1, tangibly embodied as computer-executable instructions on at least one non-transitory computer-readable medium.

10. A computer-implemented method for correlating software inventory information with delivered software, at least a portion of the method being performed by a computing device comprising at least one processor, the method comprising:
    receiving, at a client system, a software application deployed from a client-management system, the software application comprising an update to a previously installed software entity;
    initiating installation of the update on the client system;
    detecting application registration information written to the client system during the installation of the update;

identifying delivery information from the client-management system, wherein:
  the delivery information identifies the update;
  the delivery information comprises a first delivery key that identifies at least one of a vendor name, a product name, or a product version of the update;
  the delivery information does not match the application registration information;
associating the application registration information with the delivery information by creating a second delivery key that includes at least a portion of the application registration information such that the delivery information does not result in duplicate application registration information being provided for the update in a registration area of the client system as a result of the delivery information not matching the application registration information, wherein associating the application registration information with the delivery information comprises associating the application registration information with the previously installed software entity;
making the association of the application registration information and the delivery information available to at least one of:
  an add-remove-programs scanner on the client system such that when the client system presents a listing of programs, the client system does not present duplicate program entries;
  the client-management system that delivered the software application by sending the application registration information to the client-management system such that the client-management system may deliver the update to an additional client system by deploying the update to the additional client system with both the first delivery key and the second delivery key.

11. The method of claim 10, further comprising:
identifying a request to perform an inventory scan on the client system;
performing the inventory scan of the client system, wherein the inventory scan identifies the application registration information;
determining that the application registration information is associated with the previously installed software entity;
in response to the determination, associating the update with the previously installed software entity in an inventory report for the client system.

12. The method of claim 10, further comprising:
storing the second delivery key on the client system;
making the second delivery key available to the add-remove-programs scanner on the client system.

13. The method of claim 10, wherein sending the application registration information to the client-management system comprises sending the second delivery key to the client-management system.

14. The method of claim 10, wherein:
the delivery information comprises delivery information provided in metadata of an installation file of the update;
identifying the delivery information comprises:
  scanning the installation file to gather the metadata from the installation file;
  identifying the delivery information within the metadata.

15. The method of claim 10, tangibly embodied as computer-executable instructions on at least one non-transitory computer-readable medium.

16. A system for correlating software inventory information with delivered software, the system comprising:
a client-management subsystem comprising:
  a deployment module, stored in memory of the client-management subsystem, programmed to deliver, from the client-management subsystem to a client subsystem, an update to a previously installed software entity;
  a reception module, stored in the memory of the client-management subsystem, programmed to receive, from a monitoring module that is stored in memory of the client subsystem and that monitors installations on the client subsystem, application registration information written to the client subsystem during installation of the update;
  a server-side association module, stored in the memory of the client-management subsystem, programmed to:
    identify delivery information from the client-management subsystem, wherein:
      the delivery information identifies the update;
      the delivery information comprises a first delivery key that identifies at least one of a vendor name, a product name, or a product version of the update;
      the delivery information does not match the application registration information;
    associate the application registration information with the delivery information by creating a second delivery key that includes at least a portion of the application registration information, wherein:
      associating the application registration information with the delivery information comprises associating the application registration information with the previously installed software entity;
    the deployment module is further programmed to deliver the update to an additional client subsystem by deploying the update to the additional client subsystem with both the first delivery key and the second delivery key such that delivering the update to the additional client subsystem does not result in duplicate application registration information being provided for the update in a registration area of the additional client subsystem as a result of the delivery information not matching an instance of the application registration information written to the additional client subsystem during installation of the update
at least one hardware processor configured to execute the deployment module, the reception module, and the server-side association module.

17. The system of claim 16, further comprising the client subsystem, wherein the client subsystem comprises:
an installation module, stored in the memory of the client subsystem, programmed to:
  receive the update deployed from the client-management subsystem;
  install the update on the client subsystem;
the monitoring module;
a transmission module, stored in the memory of the client subsystem, programmed to send the application registration information to the client-management subsystem;
at least one hardware processor configured to execute the installation module, the monitoring module, and the transmission module.

18. The system of claim 16, wherein:
the client-management subsystem is further programmed to:
- identify a request to perform an inventory scan on the client subsystem;
- perform the inventory scan of the client subsystem, wherein the inventory scan identifies the application registration information;
- determine that the application registration information is associated with the previously installed software entity;
- in response to the determination, associate the update with the previously installed software entity in an inventory report for the client subsystem.

19. The system of claim 18, wherein:
the inventory scan identifies the application registration information by identifying entries in an add-remove programs registry of the client subsystem.

20. The system of claim 16, wherein:
the application registration information comprises data written to an add-remove-programs region of a registry of the client subsystem.

\* \* \* \* \*